United States Patent
Eble et al.

(10) Patent No.: US 11,783,444 B1
(45) Date of Patent: Oct. 10, 2023

(54) WARPING AN INPUT IMAGE BASED ON DEPTH AND OFFSET INFORMATION

(71) Applicant: Apple Inc., Cupertino, CA (US)

(72) Inventors: Tobias Eble, Sunnyvale, CA (US); Pedro Manuel Da Silva Quelhas, Sunnyvale, CA (US); Raffi A. Bedikian, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/028,004

(22) Filed: Sep. 22, 2020

Related U.S. Application Data (60) Provisional application No. 62/935,205, filed on Nov. 14, 2019.

(51) Int. Cl.
  *G06T 3/00* (2006.01)
  *G06T 11/00* (2006.01)
  *G06T 7/50* (2017.01)

(52) U.S. Cl.
  CPC .............. *G06T 3/0093* (2013.01); *G06T 7/50* (2017.01); *G06T 11/00* (2013.01); *G06T 2207/20084* (2013.01)

(58) Field of Classification Search
  CPC ......... G06T 7/50; G06T 3/0093; G06T 11/00; G06T 2207/20084
  See application file for complete search history.

(56) References Cited

U.S. PATENT DOCUMENTS

| | | | |
|---|---|---|---|
| 10,082,865 B1 * | 9/2018 | Raynal | G02B 27/0093 |
| 11,106,275 B2 | 8/2021 | McCombe et al. | |
| 2010/0238160 A1 * | 9/2010 | Yea | G06T 3/0093 |
| | | | 345/419 |
| 2012/0075432 A1 * | 3/2012 | Bilbrey | H04N 13/25 |
| | | | 348/48 |
| 2013/0207896 A1 * | 8/2013 | Robinson | G06F 3/04815 |
| | | | 345/158 |
| 2017/0214899 A1 * | 7/2017 | Meier | G06T 19/006 |
| 2017/0308992 A1 * | 10/2017 | Chalom | G06V 10/462 |
| 2017/0345220 A1 * | 11/2017 | Bates | G02B 27/017 |
| 2017/0347044 A1 * | 11/2017 | Douady-Pleven | G06T 7/00 |
| 2018/0322673 A1 * | 11/2018 | Choi | G06T 5/002 |
| 2018/0350032 A1 * | 12/2018 | Bastani | G06T 3/0093 |
| 2019/0080432 A1 * | 3/2019 | Miller | H04N 5/247 |
| 2019/0082103 A1 * | 3/2019 | Banerjee | G06T 3/4038 |

(Continued)

*Primary Examiner* — Yu Chen
(74) *Attorney, Agent, or Firm* — Fernando & Partners LLP (57) ABSTRACT

Various implementations disclosed herein include a method performed at an electronic device including one or more processors, a non-transitory memory, an image sensor, and a display device. The method includes obtaining, via the image sensor, an input image that includes an object. The method includes obtaining depth information characterizing the object, wherein the depth information characterizes a first distance between the image sensor and a portion of the object. The method includes determining a distance warp map for the input image based on a function of the depth information and a first offset value characterizing an estimated distance between eyes of a user and the display device. The method includes setting an operational parameter for the electronic device based on the distance warp map and generating, by the electronic device set to the operational parameter, a warped image from the input image.

27 Claims, 7 Drawing Sheets

(56) References Cited

U.S. PATENT DOCUMENTS

| | | | | |
|---|---|---|---|---|
| 2019/0303722 A1* | 10/2019 | Linden | ................. | G06K 9/0061 |
| 2019/0333109 A1* | 10/2019 | Teller | ................. | G06Q 30/0267 |
| 2020/0027194 A1* | 1/2020 | Nourai | ................... | G06F 3/011 |
| 2020/0160546 A1* | 5/2020 | Gu | ........................... | G06N 3/08 |
| 2020/0162714 A1* | 5/2020 | Kwak | ................... | G06T 3/0093 |
| 2020/0364876 A1* | 11/2020 | Mohan | ................... | G06F 3/012 |
| 2020/0410766 A1* | 12/2020 | Swaminathan | ....... | G06T 19/006 |
| 2021/0003869 A1* | 1/2021 | Wellen | ................. | G02F 1/1323 |
| 2021/0104063 A1* | 4/2021 | Kassis | .................... | G06F 3/013 |
| 2021/0405518 A1* | 12/2021 | Lablans | ............... | H04N 13/296 |

* cited by examiner

WARPING AN INPUT IMAGE BASED ON DEPTH AND OFFSET INFORMATION

CROSS-REFERENCE TO RELATED APPLICATIONS

This application claims priority to U.S. Provisional Patent App. No. 62/935,205, filed on Nov. 14, 2019, which is hereby incorporated by reference in its entirety.

TECHNICAL FIELD

The present disclosure relates to warping an input image, and, in particular, warping the input image based on depth and offset information.

BACKGROUND

Certain display systems, such as a head-mountable device (HMD), include an integrated camera and display. The camera obtains image data of a physical environment, and the display displays the image data for a user to view. The image data is obtained with respect to a camera plane that is based on the camera's position within the HMD, whereas the image data is displayed with respect to a display plane that is based on the display's position within the HMD. When the HMD is worn by a user, the camera and the display are spatially offset (e.g., horizontally or vertically displaced) from eyes of the user. Accordingly, the displayed image data exists in a display plane that is offset from an eye plane that is associated with the position of the user's eyes. This spatial offset between the eye plane and the display plane causes user discomfort (e.g., motion sickness) because the user's visual perception of the physical environment does not match a corresponding visual perception when the user is not wearing the HMD.

Using a graphics processing unit (GPU) for per-pixel rendering of an image is computationally expensive (e.g., power hungry) and may introduce undesirable latency into the graphics rendering pipeline. For example, per-pixel modification is problematic for a mobile device because the high computational demands results in high levels of heat dissipation.

SUMMARY

In accordance with some implementations, a method is performed at an electronic device with one or more processors, a non-transitory memory, an image sensor, and a display device. The method includes obtaining, via the image sensor, an input image that includes an object. The method includes obtaining depth information characterizing the object. The depth information characterizes a first distance between the image sensor and a portion of the object. The method includes determining a distance warp map for the input image based on a function of the depth information and a first offset value characterizing an estimated distance between eyes of a user and the display device. The method includes setting an operational parameter for the electronic device based on the distance warp map and generating, by the electronic device set to the operational parameter, a warped image from the input image.

In accordance with some implementations, an electronic device includes one or more processors, a non-transitory memory, an image sensor, and a display device. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIGS. 3A-3D are an example of warping an input image based on depth and offset information

SUMMARY

Certain display systems, such as a head-mountable device (HMD), include an integrated camera and display. The camera obtains image data of a physical environment, and the display displays the image data for a user to view. The image data is obtained with respect to a camera plane that is based on the camera's position within the HMD, whereas the image data is displayed with respect to a display plane that is based on the display's position within the HMD. When the HMD is worn by a user, the camera and the display are spatially offset (e.g., horizontally or vertically displaced) from eyes of the user. Accordingly, the displayed image data exists in a display plane that is offset from an eye plane that is associated with the position of the user's eyes. This spatial offset between the eye plane and the display plane causes user discomfort (e.g., motion sickness) because the user's visual perception of the physical environment does not match a corresponding visual perception when the user is not wearing the HMD. Moreover, using a graphics processing unit (GPU) for per-pixel rendering of an image is computationally expensive (e.g., power hungry) and may introduce undesirable latency into the graphics rendering pipeline. For example, per-pixel modification is problematic for a mobile device because the high computational demands results in high levels of heat dissipation.

By contrast, various implementations disclosed herein provide methods, electronic devices, and systems that warp image data such that, when the image data is displayed, light emanating from the display towards user's eyes is focused on the user's eyes (e.g., user's retinas). To that end, various implementations disclosed herein include warping an input image according to an operational parameter that is set based on image-to-camera distance information and display-to-eye distance information. An image sensor of the electronic device obtains an input image including an object. The electronic device obtains depth information characterizing a first distance between the image sensor and a portion of the object. In some implementations, the electronic device also obtains a first offset value characterizing an estimated distance between eyes of a user and the display device and/or obtains a second offset value characterizing a second distance between the image sensor and the display device. Based on the distance information, the electronic device determines a distance warp map. The distance warp map may provide a mapping of pixels of the input image. An operational parameter for the electronic device is set based on the distance warp map. The electronic device, set to the operational parameter, generates a warped image from the input image.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical setting refers to a world with which various persons can sense and/or interact without use of electronic systems. Physical settings, such as a physical park, include physical elements, such as, for example, physical wildlife, physical trees, and physical plants. Persons can directly sense and/or otherwise interact with the physical setting, for example, using one or more senses including sight, smell, touch, taste, and hearing.

An enhanced reality (ER) setting, in contrast to a physical setting, refers to an entirely (or partly) computer-produced setting that various persons, using an electronic system, can sense and/or otherwise interact with. In ER, a person's movements are in part monitored, and, responsive thereto, at least one attribute corresponding to at least one virtual object in the ER setting is changed in a manner that is consistent with one or more physical laws. For example, in response to an ER system detecting a person looking upward, the ER system may adjust various audio and graphics presented to the person in a manner consistent with how such sounds and appearances would change in a physical setting. Adjustments to attribute(s) of virtual object(s) in an ER setting also may be made, for example, in response to representations of movement (e.g., voice commands).

A person may sense and/or interact with an ER object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER settings, a person may sense and/or interact with only acoustic objects.

Virtual reality (VR) is one example of ER. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s). Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may, for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting. A transparent or semi-transparent display may also be included in the head mounted system. The semi-transparent or transparent display may, for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may, for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a holograph or onto a physical surface. Other examples of ER systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

Figure 1:
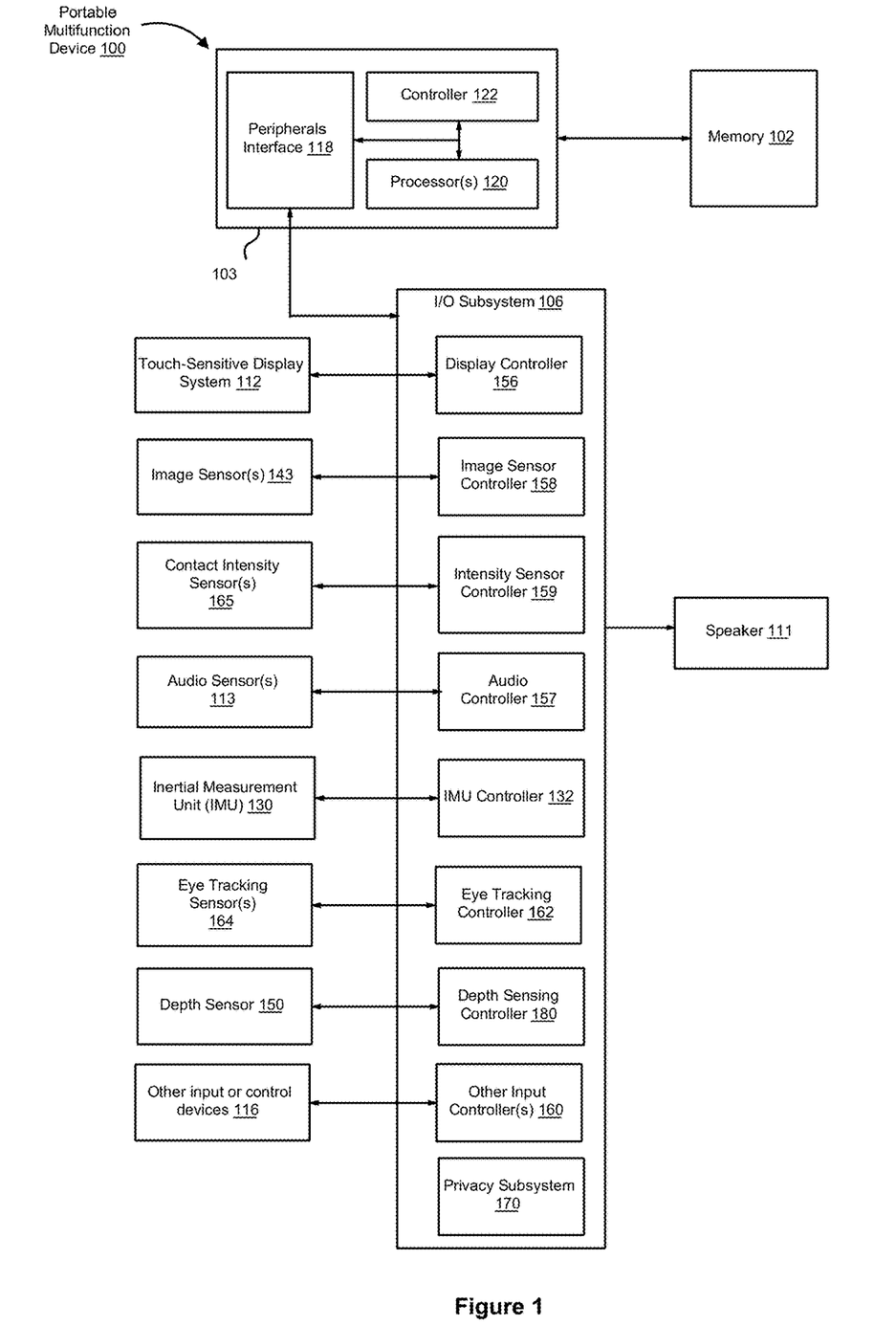
FIG. 1 is a block diagram of an example of a portable multifunction device in accordance with some implementations.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., a camera), contact intensity sensor(s) 165, audio sensor(s) 113 (e.g., microphone), a depth sensor 150, eye tracking sensor(s) 164 (e.g., included within a head-mountable device (HMD)), and other input or control device(s) 116. In some implementations, the electronic device 100 corresponds to one of a mobile phone, tablet, laptop, wearable computing device, head-mountable device (HMD), head-mountable enclosure (e.g. the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, and one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical environment.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) 143 corresponds to one or more HMD cameras. In some implementations, the image sensor(s) 143 includes one or more depth sensors. In some implementations, the image sensor(s) 143 includes a combination of a black-and-white (BW) camera and an infrared (IR) camera.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the back of the electronic device 100.

In some implementations, the depth sensor 150 is configured to obtain depth data, such as depth information characterizing an object within an obtained input image. For example, the depth sensor 150 corresponds to one of a structured light device, a time-of-flight device, and/or the like.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
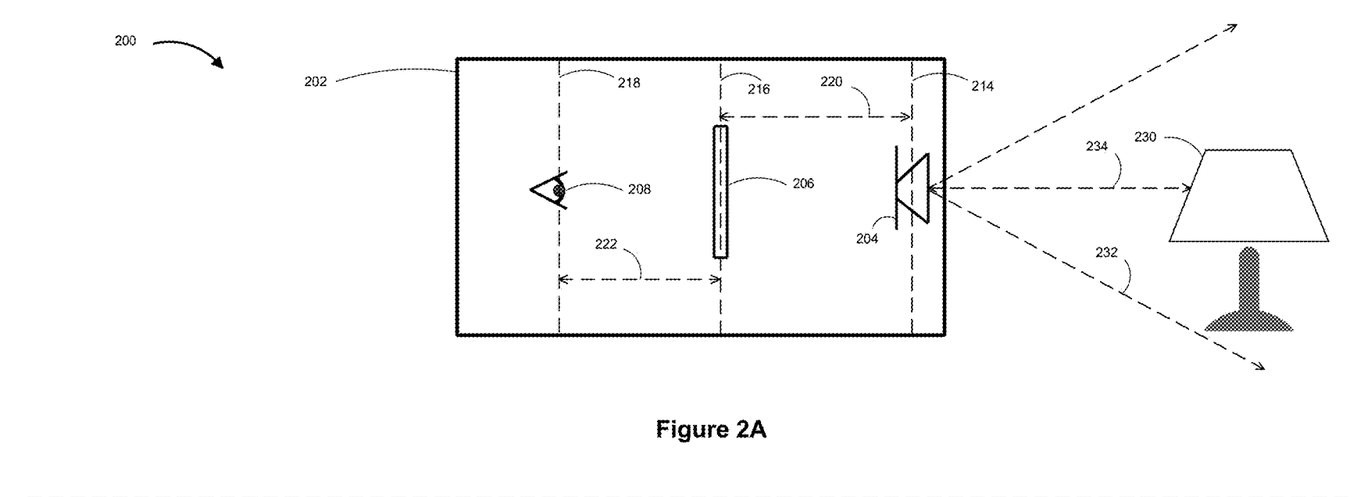
FIGS. 2A and 2B are examples of operating environments including distance offsets between components of electronic devices.
Figure 2B:
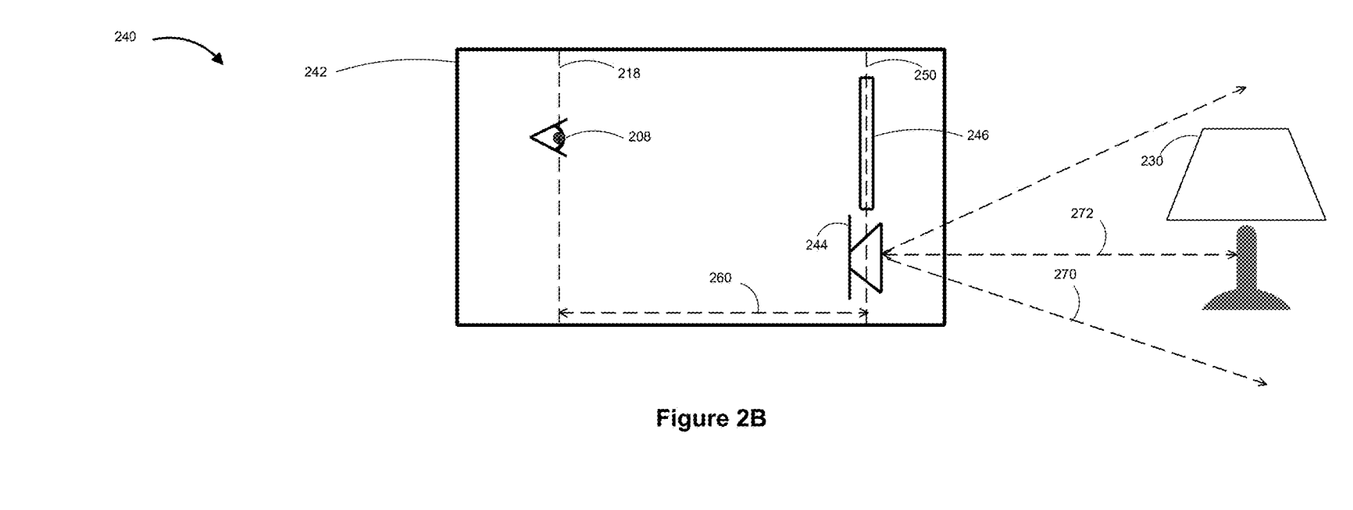

FIGS. 2A and 2B are examples of operating environments including distance offsets between components of electronic devices. FIG. 2A illustrates a first operating environment 200 that includes a first electronic device 202 (e.g., a head-mountable device (HMD)). The first electronic device 202 includes a first image sensor 204 in a first plane 214 and a first display device 206 in a second plane 216. Moreover, while the first electronic device 202 is being worn by a user (e.g., on the head of the user), the first electronic device 202 includes eyes 208 of the user in a third plane 218. The first plane 214, the second plane 216, and the third plane 218 are spatially offset from each other. Namely, the first image sensor 204 is a first distance 220 from the first display device 206 and the first display device 206 is a second distance 222 from the eyes 208.

The first operating environment 200 also includes a lamp 230. The lamp 230 is within a first field of view 232 of the first image sensor 204. The first image sensor 204 is a third distance 234 from a portion of the lamp 230, corresponding to approximately the middle of the lampshade of the lamp 230. One of ordinary skill in the art will appreciate that the portion of the lamp 230 may correspond to different portions of the lamp 230, such as is illustrated in FIG. 2B.

The first image sensor 204 obtains image data including the lamp 230. However, because of the first distance 220 between the first image sensor 204 and the first display device 206 and the second distance 222 between the first display device 206 and the eyes 208, the first electronic device 200 displays the obtained image data in the second plane 216 (e.g., display plane) that is spatially offset from the third plane 218 (e.g., eye plane). This spatial offset between the eye plane and the display plane causes user discomfort (e.g., motion sickness) because the user's visual perception of the physical environment does not match a corresponding visual perception when the user is not wearing the first electronic device 202. As will be described below, various implementations disclosed herein address these issues.

FIG. 2B illustrates a second operating environment 240 that includes a second electronic device 242 including a second image sensor 244 and a second display device 246. The second image sensor 244 includes, in a second field of view 270, the lamp 230. A fourth distance 272 separates the second image sensor 244 and a portion of the lamp 230, corresponding to approximately the middle of the body of the lamp 230.

In contrast to the components integrated in the first electronic device 202 illustrated in FIG. 2A, the second image sensor 244 and the second display device 246 exist in a common plane 250. Nevertheless, the eyes 208 exist in the third plane 218 that is spatially offset from the common plane 250 by a fifth distance 260. Accordingly, as described above with respect to FIG. 2A, the user experiences discomfort resulting from the spatial offset (e.g., the fifth distance 260) between the eyes 208 and the second display device 246 that displays image data obtained by the second image sensor 244.

FIGS. 3A-3D are an example of warping an input image based on depth and offset information. While pertinent features are shown, those of ordinary skill in the art will appreciate from the present disclosure that various other features have not been illustrated for the sake of brevity and so as not to obscure more pertinent aspects of the example implementations disclosed herein.

Figure 3A:
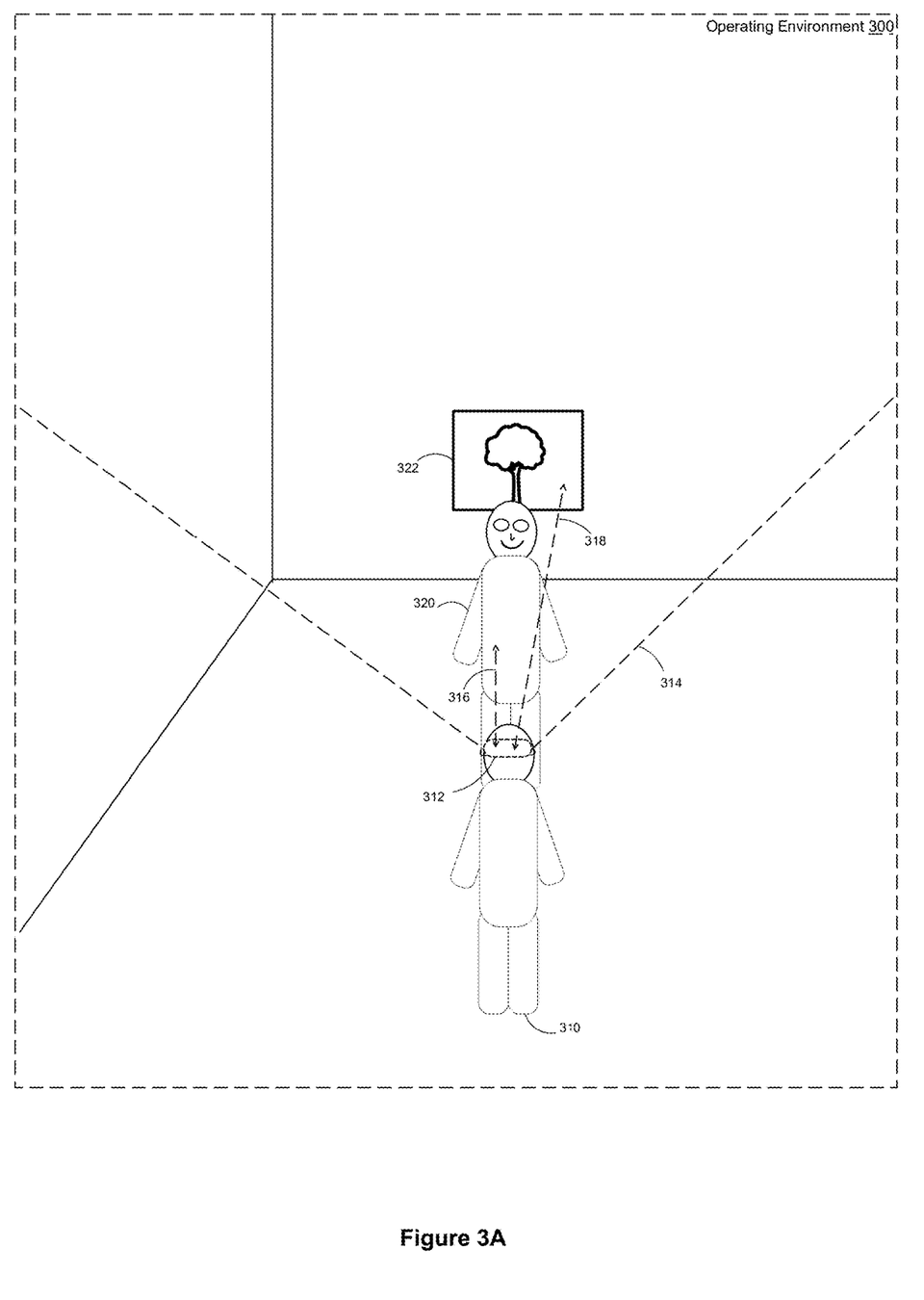

As illustrated in FIG. 3A, an operating environment 300 includes a user 310 wearing an electronic device 312. In some implementations, the electronic device 312 corresponds to the first electronic device 202 in FIG. 2A or the second electronic device 242 in FIG. 2B. In some implementations, the electronic device 312 corresponds to a mobile device, such as a smartphone, tablet, media player, laptop, etc. In some implementations, the electronic device 312 corresponds to a head-mountable device (HMD) that includes an integrated display device (e.g., a built-in display) that displays the plurality of sequential images. In some implementations, the HMD includes a head-mountable enclosure. In various implementations, the head-mountable enclosure includes an attachment region to which another device with a display device can be attached. In various implementations, the head-mountable enclosure is shaped to form a receptacle for receiving another device that includes a display device. For example, in some implementations, the electronic device 312 slides/snaps into or otherwise attaches to the head-mountable enclosure. In some implementations, the display of the device attached to the head-mountable enclosure presents (e.g., displays) an input image. For example, in some implementations, the electronic device 312 corresponds to a mobile phone that can be attached to the head-mountable enclosure.

The electronic device 312 includes an image sensor that is associated with a field of view 314 that includes an individual 320 and a painting 322. The image sensor of the electronic device 312 is a first distance 316 away from the individual 320 and a second distance 318 away from the painting 322. The first distance 316 is less than the second distance 318 because the painting 322 is behind the individual 320 in the operating environment 300.

Figure 3B:
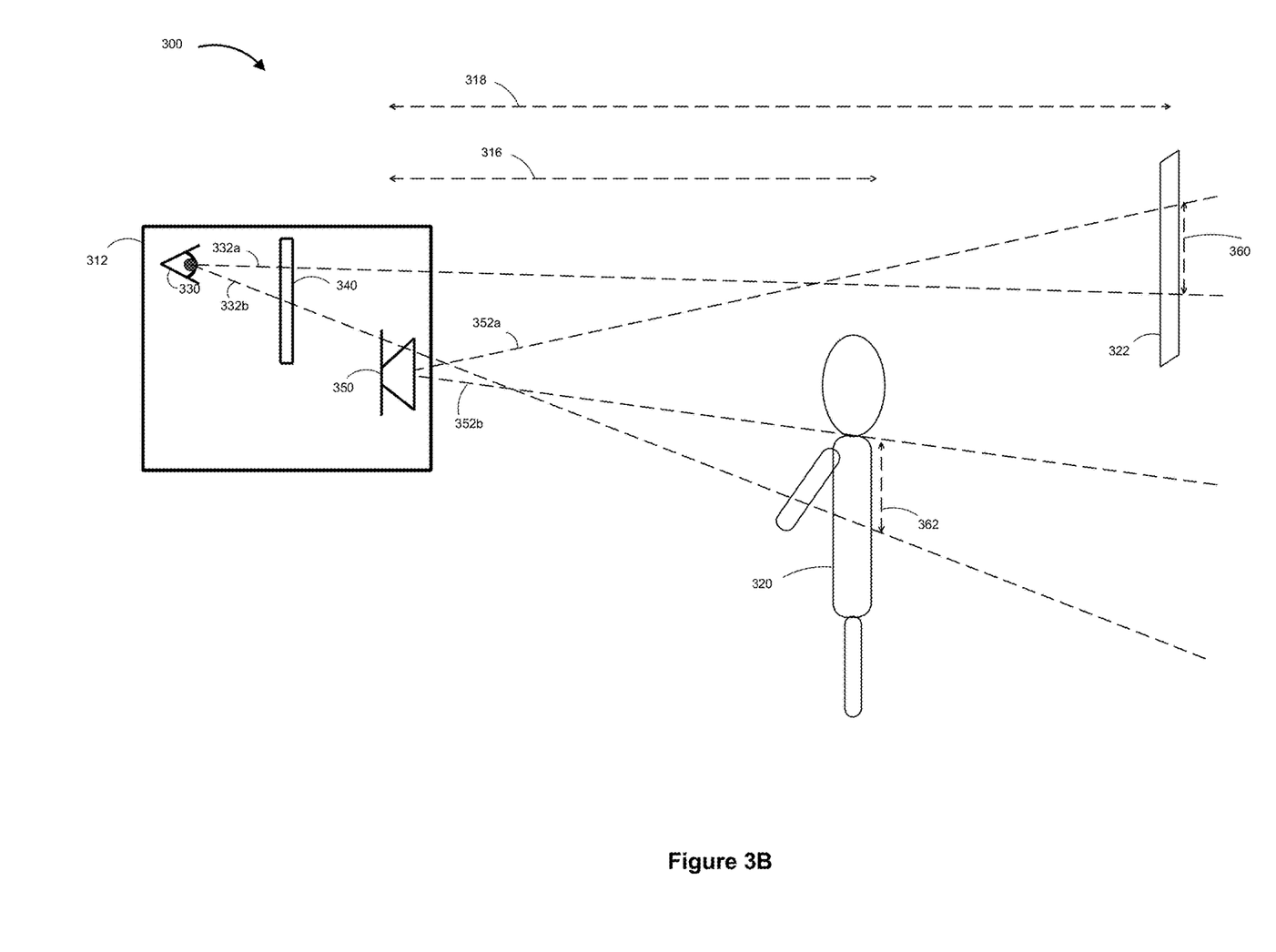

FIG. 3B illustrates a side view of the operating environment 300. The electronic device 312 includes an image sensor 350 and a display device 340. The image sensor 350 is the first distance 316 away from the individual 320 and the second distance 318 away from the painting 322. The image sensor 350 is associated with a first field of view 352 including a first component 352a and a second component 352b. In some implementations, the image sensor 350 is a camera, such as forward-facing camera.

While the electronic device 312 is being worn by the user 310, the electronic device 312 houses eyes 330 of the user 310. The eyes 330 of the user 310 view an image or a series of images (e.g., a video stream) that are obtained by the image sensor 350, and displayed to the eyes 330 by the display device 340. The eyes 330 have a second field of view 332 including a third component 332a and a fourth component 332b. The difference between the first field of view 352 and the second field of view 332 may result in user discomfort.

The image sensor 350 captures a first portion 360 of the operating environment 300 and transmits the first portion 360 to the display device 340 for display to the eyes 330. However, the first portion 360 is outside the second of field of view 332 associated with the eyes 330, as indicated by the dashed arrow between the first component 352a of the first field of view 352 and the third component 332a of the second field of view 332. In other words, the eyes 330 of the user 310 are presented with a portion of the operating environment 300 that the eyes 330 would not perceive if the user 310 were not wearing the electronic device 312.

As another example, the image sensor 350 does not capture a second portion 362 of the operating environment 300 because the second portion 362 is outside the first field of view 352. Accordingly, the display device 340 does not display the second portion 362. However, the second portion 362 is within the second of field 332 associated with the eyes 330, as indicated by the dashed arrow between the second component 352b of the first field of view 352 and the fourth component 332b of the second field of view 332. In other words, the eyes 330 of the user 310 are not presented with a portion of the operating environment 300 that the eyes 330 would perceive if the user 310 were not wearing the electronic device 312.

Figure 3C:
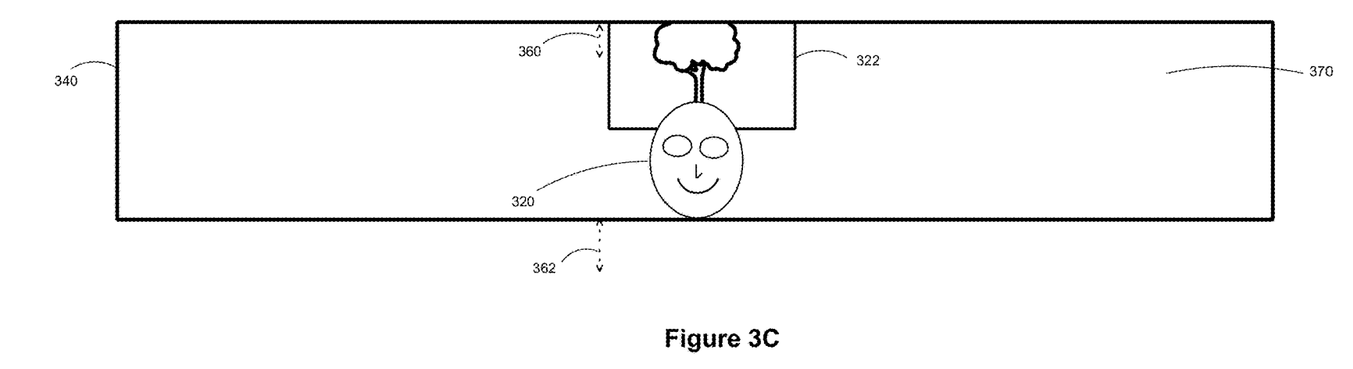
Figure 3D:
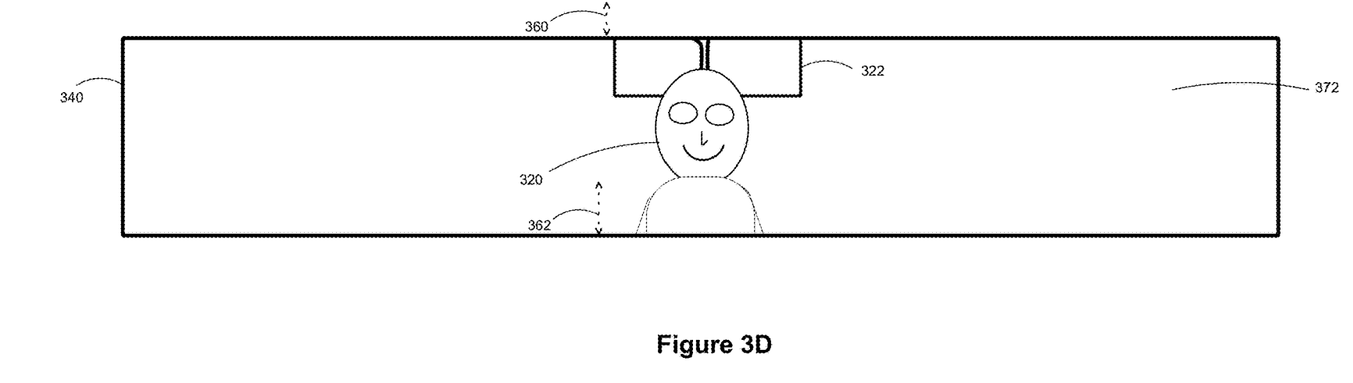

In order to resolve these issues, the electronic device 312 warps portions of the operating environment 300 based on depth and offset information, as illustrated in FIGS. 3C and 3D. As illustrated in FIG. 3C, the display device 340 displays an input image 370 that corresponds to what is displayed to the eyes 330 of the user 310 in FIGS. 3A and 3B. The image sensor 350 obtains the input image 370. Notably, the input image 370 includes the first portion 360 of the operating environment 300 that the user 310 would not see if not wearing the electronic device 312. The first portion 360 corresponds to an upper part of a tree in the painting 322. Moreover, the input image 370 does not includes the second portion 362 of the operating environment 300 that the user would see if not wearing the electronic device 312. The second portion 362 corresponds to a portion of the individual 320 that is below the head of the individual 320 (e.g., the shoulders of the individual 320).

The electronic device 312 obtains depth information characterizing an object within the input image 370. For example, the object corresponds to the individual 320 or the painting 322. The depth information characterizes a distance between the image sensor 350 and a portion of the object, such as the first distance 316 between the image sensor 350 and the individual 320 or the second distance 318 between the image sensor 350 and the painting 322, as illustrated in FIG. 3B.

The electronic device 312 determines a distance warp map for the input image 370 based on a function of the depth information and a first offset value. The depth information characterizes an estimated distance between the eyes 330 of the user 312 and the display device 340. For example, with reference to FIG. 2A, the estimated distance corresponds to the second distance 222 between the first display device 206 and the eyes 208. As another example, with reference to FIG. 2B, the estimated distance corresponds to the fifth distance 260 between the second display device 246 and the eyes 208. The electronic device 312 sets an operational parameter based on the distance warp map. For example, the operational parameter may be associated with the image sensor 350.

As illustrated in FIG. 3D, the electronic device 312, while set to the operational parameter, generates a warped image 372 from the input image 370. The display device 340 replaces the input image 370 with the warped image 372, as illustrated in FIG. 3D. In contrast with the input image 370 in FIG. 3C, the warped image 372 does not include the first portion 360 of the operating environment 300 and includes the second portion 362 of the operating environment 300. Accordingly, as compared with other display systems, the display device 340 displays an image that more closely matches what the user 310 would see if the user 310 were not wearing the electronic device 312. Accordingly, the electronic device 312 reduces user discomfort caused by other display systems and thus provides a more enjoyable user experience. Additionally, the electronic device 312 warps the input image 370 using fewer computational resources (e.g., less processing resources and lower power consumption) than display systems that use a graphics processing unit (GPU) for per-pixel rendering of an image.

Figure 4:
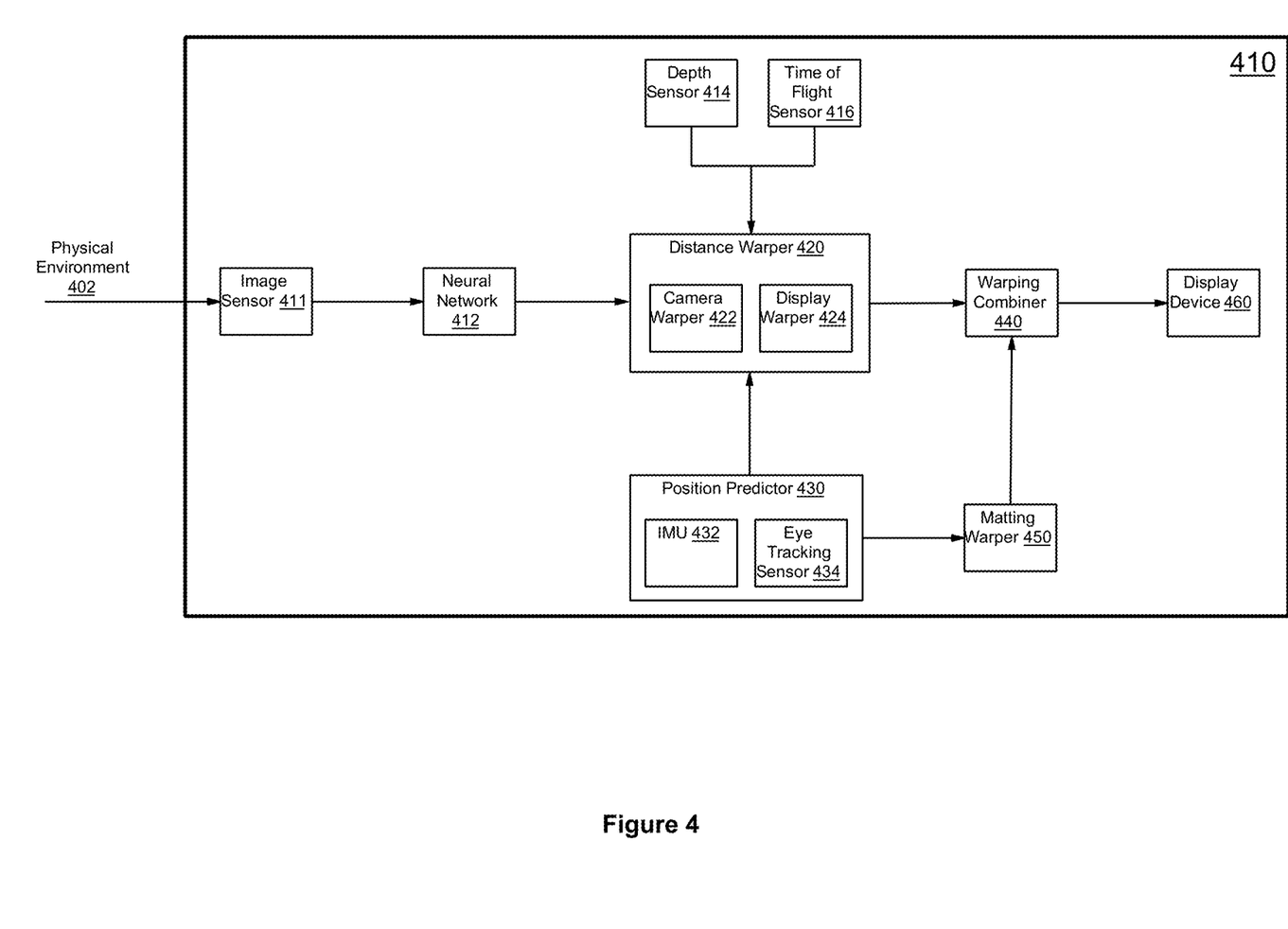
FIG. 4 is an example of a block diagram for warping an input image based on depth and offset information in accordance with some implementations.

FIG. 4 is an example of a block diagram 410 for warping an input image based on depth and offset information in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

The block diagram 410 includes an image sensor 411 that obtains an input image of a physical environment 402. For example, the input image corresponds to the input image 370 of the operating environment 300 described above with reference to FIGS. 3A-3D.

The block diagram 410 includes a distance warper 420 that obtains (e.g., determines) depth information characterizing an object in the input image. The depth information characterizes a first distance between the image sensor 411 and a portion of the object. According to various implementations, the block diagram 410 includes components that facilitate obtaining or determining the depth information. For example, in some implementations, the block diagram 410 includes a neural network 412 that generates machine-learned depth information, such as identification information associated with the input image (e.g., instance segmentation and/or semantic segmentation). As another example, in some implementations, the block diagram 410 includes a combination of a depth sensor 414 that senses the depth information associated with the physical environment 402 and a time of flight sensor 416 that obtains time of flight information, from which the depth information may be determined.

The distance warper 420 determines a distance warp map for the input image based on a function of the depth information and a first offset value characterizing an estimated distance between eyes of a user and a display device 460. The distance warper 420 includes a camera warper 422 that generates warping parameters based on the depth information. The distance warper 420 includes a display warper 424 that generates warping parameters based on the offset value. In some implementations, the display warper 424 obtains (e.g., determines, measures, or computes) the offset value, such as based on form factor information about the block diagram 410 or user profile information. In some implementations, the distance warper 420 determines the distance warp map based at least in part on predicted movement of the block diagram 400, as determined by a position predictor 430. For example, in some implementations, the distance warper 420 determines the distance warp map by selecting a particular object, from among a plurality of objects in the input image, based on the predicted movement. In some implementations, the predicted movement is determined based on positional change data obtained from an IMU 432. In some implementations, the predicted movement is determined based on eye gaze data obtained from an eye tracking sensor 434. In some implementations, the predicted movement is determined based on head pose and/or body pose data.

The distance warper 420 sets an operational parameter of the block diagram 410 based on the distance warp map. The distance warper 420 generates a warped image from the input image while being set to the operation parameter. The display device 460 displays the warped image.

In some implementations, the block diagram 410 includes a warping combiner 440 and a matting warper 450 that collectively perform a matting operation on the warped image. The display device 460 may display the matted image. The matting warper 450 determines an image matting warp that is based on a function of the input image and the depth information. For example, the image matting warp helps to extract the correct part of the input image. As another example, the matting warper 450 generates an output image by overlaying enhanced reality (ER) content onto the warped image according to the image matting warp.

Figure 5:
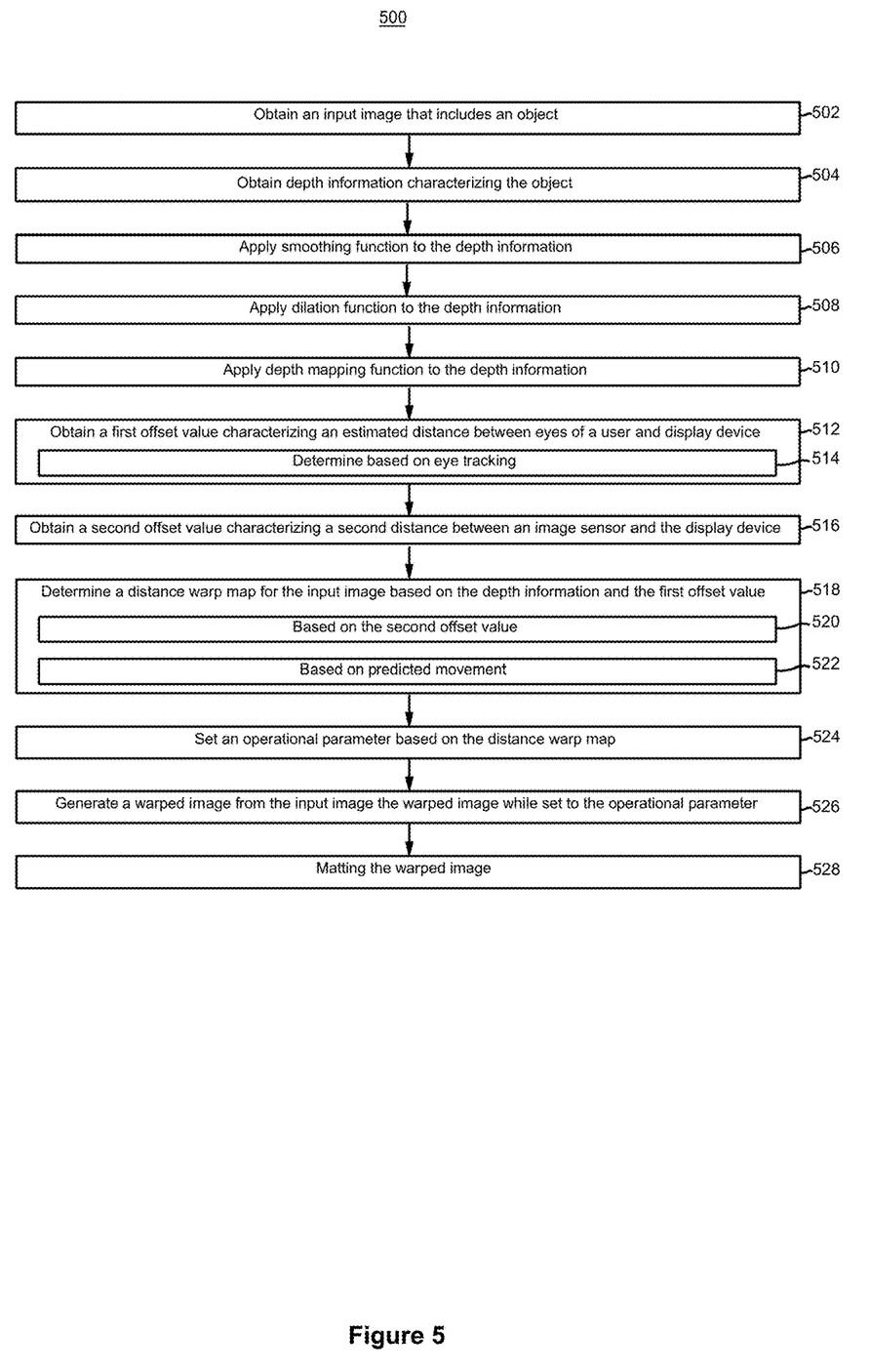
FIG. 5 is an example of a flow diagram of a method of warping an input image based on depth and offset information in accordance with some implementations.

FIG. 5 is an example of a flow diagram of a method 500 of warping an input image based on depth and offset information in accordance with some implementations. In various implementations, the method 500 or portions thereof are performed by an electronic device (e.g., the electronic device 100 in FIG. 1 or the electronic device 312 in FIGS. 3A-3D). In various implementations, the method 500 or portions thereof are performed by the block diagram 410 in FIG. 4. In various implementations, the method 500 or portions thereof are performed by a head-mountable device (HMD) including an integrated display device. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, the method 500 includes obtaining, via an image sensor, an input image that includes an object. For example, the object corresponds to one of a movable inanimate object (e.g., a chair), a structural inanimate object (e.g., wall, ceiling, etc.), a living object (e.g., a person or an animal), and/or the like.

As represented by block 504, the method 500 includes obtaining depth information characterizing the object. The depth information characterizes a first distance between the image sensor and a portion of the object. In some implementations, the depth information includes a machine learned depth information, such as from a neural network. In some implementations, the depth information is obtained from a depth sensor, such as time of flight information. In some implementations, the depth information is obtained via visual inertia odometry (VIO). In some implementations, the depth information corresponds to three-dimensional (3D) reconstruction data.

As represented by block 506, in some implementations, the method 500 includes applying a smoothing function to the depth information. For example, the smoothing function operates to spread an error over a larger region. As another example, the smoothing function implements symmetric smoothing or asymmetric smoothing. As yet another example, the smoothing function implements distance dependent filtering.

As represented by block 508, in some implementations, the method 500 includes applying a dilation function to the depth information. For example, the dilation function functions to remove artifacts on a foreground portion of the input image, such as prioritizing the foreground portion while accepting distortion with respect to a background portion of the input image within a performance threshold. As another example, the dilation function is based on visual saliency.

As represented by block 510, in some implementations, the method 500 includes applying a depth mapping function to the depth information. Applying the depth mapping function may help to ensure stereo consistency. For example, the depth mapping function is similar to tone mapping. As another example, the depth mapping function compresses range for high to low range. As yet another example, the depth mapping function may implement static or dynamic depth mapping. In some implementations, the method 500 includes obtaining eye gaze data (e.g., via an eye gaze sensor of the electronic device) and use the eye gaze data as an input to the depth mapping function. In some implementations, the method 500 includes using the depth mapping function in making cache request decisions.

As represented by block 512, in some implementations, the method 500 includes obtaining a first offset value characterizing an estimated distance between eyes of a user and a display device of the electronic device. For example, the first offset value is based on a form factor of an HMD that includes the display device. As another example, the first offset value is based on time of flight information, such as obtained from a depth sensor. As yet another example, the first offset value is based on a user profile. As represented by block 514, in some implementations, obtaining the first offset value includes determining the first offset value based on eye tracking data that is obtained via an eye tracking sensor integrated in the electronic device. The eye tracking data indicates eye gaze information, such as a focus of the user's eyes, point of regard, etc.

As represented by block 516, in some implementations, the method 500 includes obtaining a second offset value characterizing a second distance between the image sensor and the display device. In some implementations, the display device is associated with a display plane that is spatially offset from an image sensor plane associated with the image sensor.

As represented by block 518, the method 500 includes determining a distance warp map for the input image based on a function of the depth information and the first offset value. In some implementations, the distance warp map is also a function of one or more of the smoothing function (described with respect to block 506), the dilation function (described with respect to block 508), or the depth mapping function (described with respect to block 510). As represented by block 520, in some implementations, the distance warp map is also a function of the second offset value.

As represented by block 522, in some implementations, the method 500 includes determining predicted movement of the electronic device, wherein determining the distance warp map includes selecting the object, from among a plurality of objects in the input image, based on the predicted movement. In some implementations, the predicted movement is determined based on positional change data obtained from an IMU. In some implementations, the predicted movement is determined based on eye gaze data. In some implementations, the predicted movement is determined based on head pose and/or body pose data.

As represented by block 524, the method 500 includes setting an operational parameter for the electronic device based on the distance warp map. For example, the operational parameter is associated with the image sensor of the electronic device. As represented by block 526, the method 500 includes generating, by the electronic device set to the operational parameter, a warped image from the input image. For example, with reference to FIGS. 3C and 3D, the electronic device 312, while set to the operational parameter, generates the warped image 372 from the input image 370.

As represented by block 528, in some implementations, the method 500 includes matting the warped image. To that end, the method 500 includes determining an image matting warp that is based on a function of the input image and the depth information. For example, the image matting warp helps to extract the correct part of the input image. Further to that end, the method 500 includes generating an output image by overlaying enhanced reality (ER) content onto the warped image according to the image matting warp. For example, the ER content is hole fill content. As another example, the ER content is rendered via a graphics processing unit (GPU). Further to that end, the method 500 includes displaying, via the display device, the output image.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be openended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:
1. A method comprising:
    at an electronic device including one or more processors, a non-transitory memory, an image sensor, and a display device:
        obtaining, via the image sensor, an input image that includes an object;

obtaining depth information characterizing the object, wherein the depth information characterizes a first distance between the image sensor and a portion of the object within the input image;

determining a distance warp map for the input image based on a function of the first distance, a first offset value characterizing an estimated distance between a first vertical plane that includes eyes of a user and a second vertical plane that includes the display device, and a second offset value characterizing a distance between a third vertical plane that includes the image sensor and the second vertical plane that includes the display device;

setting an operational parameter for the electronic device based on the distance warp map; and generating, by the electronic device set to the operational parameter, a warped image from the input image.

2. The method of claim 1, further comprising obtaining the first offset value.

3. The method of claim 2, wherein obtaining the first offset value includes determining the first offset value based on eye tracking data that is obtained via an eye tracking sensor integrated in the electronic device.

4. The method of claim 1, wherein the electronic device corresponds to a head-mountable device (HMD).

5. The method of claim 1, wherein the warped image is generated by a fixed function system included in the electronic device.

6. The method of claim 1, wherein the depth information is obtained from a neural network.

7. The method of claim 1, wherein the depth information is obtained via a depth sensor integrated in the electronic device.

8. The method of claim 1, further comprising applying a smoothing function to the depth information, wherein the distance warp map is a function of the smoothing function as applied to the depth information.

9. The method of claim 1, further comprising applying a dilation function to the depth information, wherein the distance warp map is a function of the dilation function as applied to the depth information.

10. The method of claim 1, further comprising applying a depth mapping function to the depth information, wherein the distance warp map is a function of the depth mapping function as applied to the depth information.

11. The method of claim 1, further comprising:
determining an image matting warp that is based on a function of the input image and the depth information;
generating an output image by overlaying enhanced reality (ER) content onto the warped image according to the image matting warp; and
displaying, via the display device, the output image.

12. The method of claim 1, further comprising determining predicted movement of the electronic device, wherein determining the distance warp map includes selecting the object, from among a plurality of objects in the input image, based on the predicted movement.

13. The method of claim 1, wherein setting the operational parameter of the electronic device includes setting the operational parameter of the image sensor, and wherein generating the warped image occurs while the image sensor is set to the operational parameter.

14. The method of claim 10, wherein applying the depth mapping function to the depth information includes compressing the depth information for high to low range.

15. The method of claim 10, wherein the electronic device includes an eye gaze sensor that generates eye gaze data associated with the eyes of the user, and wherein the depth mapping function is based on the eye gaze data.

16. An electronic device comprising:
one or more processors;
a non-transitory memory;
an image sensor;
a display device; and
one or more programs, wherein the one or more programs are stored in the non-transitory memory and configured to be executed by the one or more processors, the one or more programs including instructions for:
obtaining, via the image sensor, an input image that includes an object;
obtaining depth information characterizing the object, wherein the depth information characterizes a first distance between the image sensor and a portion of the object within the input image;
determining a distance warp map for the input image based on a function of the first distance, a first offset value characterizing an estimated distance between a first vertical plane that includes eyes of a user and a second vertical plane that includes the display device, and a second offset value characterizing a distance between a third vertical plane that includes the image sensor and the second vertical plane that includes the display device;
setting an operational parameter for the electronic device based on the distance warp map; and
generating, by the electronic device set to the operational parameter, a warped image from the input image.

17. The electronic device of claim 16, the one or more programs including instructions for determining the first offset value based on eye tracking data that is obtained via an eye tracking sensor integrated in the electronic device.

18. The electronic device of claim 16, wherein the warped image is generated by a fixed function system included in the electronic device.

19. The electronic device of claim 16, wherein the depth information is obtained from a neural network.

20. The electronic device of claim 16, wherein the one or more programs further include instructions for applying a smoothing function to the depth information, wherein the distance warp map is a function of the smoothing function as applied to the depth information.

21. The electronic device of claim 16, wherein the one or more programs further include instructions for applying a dilation function to the depth information, wherein the distance warp map is a function of the dilation function as applied to the depth information.

22. A non-transitory computer readable storage medium storing one or more programs, the one or more programs comprising instructions, which, when executed by an electronic device with one or more processors, an image sensor, and a display device, cause the electronic device to:
obtain, via the image sensor, an input image that includes an object;
obtain depth information characterizing the object, wherein the depth information characterizes a first distance between the image sensor and a portion of the object within the input image;
determine a distance warp map for the input image based on a function of the first distance, a first offset value characterizing an estimated distance between a first vertical plane that includes eyes of a user and a second vertical plane that includes the display device, and a second offset value characterizing a distance between a third vertical plane that includes the image sensor and the second vertical plane that includes the display device;

set an operational parameter for the electronic device based on the distance warp map; and generate, by the electronic device set to the operational parameter, a warped image from the input image.

23. The non-transitory computer readable storage medium of claim 22, wherein the one or more programs comprise instructions, which, when executed by the electronic device, cause the electronic device to determine the first offset value based on eye tracking data that is obtained via an eye tracking sensor integrated in the electronic device.

24. The non-transitory computer readable storage medium of claim 22, wherein the depth information is obtained via a depth sensor integrated in the electronic device.

25. The non-transitory computer readable storage medium of claim 22, wherein the one or more programs further cause the electronic device to apply a dilation function to the depth information, wherein the distance warp map is a function of the dilation function as applied to the depth information.

26. The non-transitory computer readable storage medium of claim 22, wherein the one or more programs further cause the electronic device to apply a depth mapping function to the depth information, wherein the distance warp map is a function of the depth mapping function as applied to the depth information.

27. The non-transitory computer readable storage medium of claim 22, wherein the one or more programs further cause the electronic device to apply a depth mapping function to the depth information, wherein the distance warp map is a function of the depth mapping function as applied to the depth information.

* * * * *